United States Patent [19]

Taniguchi et al.

[11] Patent Number: 5,210,430
[45] Date of Patent: May 11, 1993

[54] ELECTRIC FIELD LIGHT-EMITTING DEVICE

[75] Inventors: Yasushi Taniguchi, Kawasaki; Keiji Hirabayashi, Tokyo; Noriko Kurihara, Sekimachi; Keiko Ikoma, Shioiri, all of Japan

[73] Assignee: Canon Kabushiki Kaisha, Tokyo, Japan

[21] Appl. No.: 457,864

[22] Filed: Dec. 27, 1989

[30] Foreign Application Priority Data

| | | | |
|---|---|---|---|
| Dec. 27, 1988 | [JP] | Japan | 63-327884 |
| Dec. 27, 1988 | [JP] | Japan | 63-327885 |
| Dec. 27, 1988 | [JP] | Japan | 63-327886 |
| Dec. 27, 1988 | [JP] | Japan | 63-327887 |
| Nov. 25, 1989 | [JP] | Japan | 1-305375 |

[51] Int. Cl.$^5$ .................................. H01L 33/00
[52] U.S. Cl. .................................. 257/103; 257/77; 313/509
[58] Field of Search ............ 357/17, 16, 61; 313/503, 509, 311; 428/690, 691; 427/38, 39, 64, 66, 122; 437/26, 100

[56] References Cited

U.S. PATENT DOCUMENTS

| | | | |
|---|---|---|---|
| 3,767,980 | 10/1973 | Kamath | 357/63 |
| 4,164,680 | 8/1979 | Villalobos | 313/311 |
| 4,394,601 | 7/1983 | Takeda et al. | 313/509 |
| 4,504,519 | 3/1985 | Zelez | 427/39 |
| 4,547,703 | 10/1985 | Fujita et al. | 357/17 |
| 4,727,004 | 2/1988 | Tanaka et al. | 313/503 |
| 4,770,950 | 9/1988 | Ohnishi | 313/503 |
| 4,816,113 | 3/1989 | Yamazaki | 427/122 |
| 4,908,603 | 3/1990 | Yamaue et al. | 313/503 |
| 4,914,490 | 4/1990 | Takasu et al. | 357/17 |
| 4,916,496 | 4/1990 | Tomomura et al. | 357/17 |
| 4,920,387 | 4/1990 | Takasu et al. | 357/17 |
| 4,925,701 | 5/1990 | Jansen et al. | 427/45.1 |
| 4,987,460 | 1/1991 | Takasu et al. | 357/17 |
| 4,988,579 | 1/1991 | Tomomura et al. | 357/17 |
| 5,051,785 | 9/1991 | Beetz, Jr. et al. | 357/4 |

FOREIGN PATENT DOCUMENTS

| | | |
|---|---|---|
| 0195678 | 9/1986 | European Pat. Off. . |
| 0312383 | 4/1989 | European Pat. Off. . |
| 51100 | 3/1983 | Japan . |
| 110494 | 7/1983 | Japan . |
| 2632 | 1/1986 | Japan . |
| 27039 | 2/1987 | Japan . |
| 1-102893 | 4/1989 | Japan . |

OTHER PUBLICATIONS

Y. Taniguchi et al., "Blue Electroluminescence of Thin-Film Diamond Made by Hot-Filament Method" Japanese Journal of Applied Physics, vol. 28, No. 10, Part 2, Oct., 1989, pp. 1848-1850.

S. B. Kim et al., "Diamond-like Carbon as an Electroluminescent Material" Extended Abstracts/Electrochemical Society, vol. 87-2, 1987 p. 1708, Abstract No. 1227.

The Japan New Materials Letter, vol. 8, No. 11, Jun. 1989, p. 4, "Sumito Electric Industries".

J. R. Prior et al., "Electroluminescence in Diamond" Proc. Phys. Soc., vol. 80 (1962) pp. 849-859.

"Nikkei Industrial Newspaper" (Oct. 7, 1987).

*Primary Examiner*—Rolf Hille
*Assistant Examiner*—Tan Ho
*Attorney, Agent, or Firm*—Fitzpatrick, Cella, Harper & Scinto

[57] ABSTRACT

An electric field effect light emitting device comprises a light emitting layer consisting of a diamond-like carbon film containing oxygen.

52 Claims, 10 Drawing Sheets

FIG. 3(a)
FIG. 3(b)
FIG. 3(c)
FIG. 3(d)
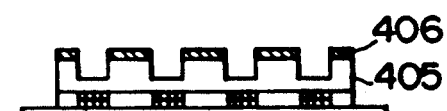
FIG. 3(e)
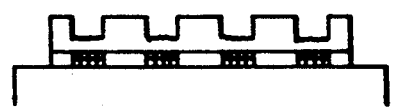
FIG. 3(f)
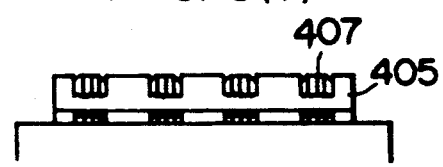
FIG. 3(g)
FIG. 3(h)
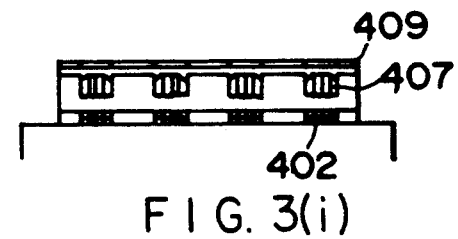
FIG. 3(i)

ELECTRIC FIELD LIGHT-EMITTING DEVICE

BACKGROUND OF THE INVENTION

1. Field of the Invention

The present invention relates to an electric field light-emitting device or an electro-luminescence (EL) device adapted for use as a flat panel display device or a light source therefor, or as a one or two-dimensional light-emitting device.

2. Related Background Art

The electroluminescence device has been developed as a flat light source, and is attracting attention in recent years because of improvements in the luminance and service life characteristics, relative ease of preparation of a large-area device with satisfactory uniformity of luminance, a small thickness, a light weight and possibility of flexibility in device.

Also such electroluminescence device is attracting attention in the office automation-related applications such as a rear illumination for liquid crystal display, a charge eliminating light source for a plain paper copying machine, and other applications requiring a high contrast, a high resolving power and a wide viewing angle.

In such conventional thin film EL device, the matrix crystal of the light emitting layer is composed for example of ZnS, ZnSe, CaS or SeS. Also the light emitting centers are composed for example of rare earth elements, transition metals, halogen atoms, alkali metal, alkali earth metals, or compounds containing these elements according to the colors to be generated.

However, the light emitting film of such thin film EL device, which is conventionally formed by resistance heating, electron beam evaporation or sputtering, is particularly susceptible to humidity for example due to structural defects of the film and is associated with the drawbacks of unstable light emission and film deterioration, so that a moisture insulating film, covering also the end faces of the device, has been indispensable.

For solving such problem of moisture resistance, an EL device in which the light emitting layer is composed of a diamond-state carbon film was disclosed in Appl. Phys. Lett. (53(19) Sept. 1988).

Such EL device is superior in the moisture resistance to the EL devices with conventional materials, but is still associated with drawbacks such as a high applied voltage, a low luminance and a short service life.

Also among the conventional EL devices utilizing ZnS or ZnSe, those utilizing ZnS:Mn for yellow-orange color emission are known to be of a high luminance and a long service life, but those utilizing Tm, Cu-Cl or Cu-Al as the light emitting centers for blue color emission are associated with the drawbacks of low luminance and short service life.

Electroluminescence of diamond was also reported for example by J. R. Briole and F. C. Champion (Proc. Phys. Soc. p.849-859, 80 (1962)) on granular diamonds of about 1 mm in size.

The use of diamond in the light emitting layer at first provides an advantage of a band gap as large as 5.4 eV, which allows a wide selection of elements and compounds usable as the light emitting center, and enables blue light emission.

Also the diamond has an insulation voltage equal to or higher than 1 MV/cm so that the electrons for exciting the light emitting centers can be sufficiently accelerated, and a high luminance can be attained by the efficient excitation of the light emitting centers. Besides the diamond is chemically stable, and not easily affected by humidity or atmosphere, so that a device of long service life can be obtained.

However granular diamond crystals of about 1 mm in size are unable to form a high density matrix in the light emitting layer.

Also such diamond is not suitable for mass production of EL devices of uniform luminance. In addition, since the diamond requires an extremely high voltage for light emission, it is not suitable for practical use as the device for display requiring a large area.

Furthermore, the diamond, when used as the matrix crystal of the light emitting layer, can increase the number of atoms or compounds constituting the light emitting centers, thus enabling multi-color emission due to the band gap as large as 5.4 eV.

However the light emitting layer composed of granular diamond crystals of about 1 mm in size is associated with the drawbacks of difficulty of doping of elements constituting the light emitting centers, difficulty of forming a high density matrix and inability for forming a flat panel or a two-dimensional light emitting device.

Also, a thin diamond film formed by conventional gaseous synthesis is a polycrystalline film having surface irregularities of several thousand Angstroms. Also a small amount of amorphous carbon or graphite may be present for example in the crystal grain boundaries, depending on the film forming method.

If such thin diamond film is employed as the light emitting layer of an EL device, with electrodes directly attached thereto, there may be locally applied a high electric field depending on the surface topography, eventually leading to destruction of insulation, or the insulation voltage the diamond layer is lowered due to the impurities present therein or the element or compound doped as the light emitting centers, eventually leading to the destruction of insulation under a high electric field, so that the performance of the device is inevitably unstable.

Such diamond film with uneven surface inevitably results in irregular and unstable contact between said thin film and the electrode, whereby a local high electric field is generated at the voltage application.

SUMMARY OF THE INVENTION

In consideration of the foregoing, an object of the present invention is to provide an electroluminescence device composed of a high density matrix of devices which are not associated with the drawbacks of prior art, have an excellent moisture resistance and provides a long service life and a high luminance even under a low driving voltage.

Another object of the present invention is to provide an electroluminescence device providing a high luminance and a long service life particularly in the blue color range or short wavelength range.

Still another object of the present invention is to provide an electric field injection light emitting device of a long service life and a high luminance, capable of covering the entire visible wavelength range.

BRIEF DESCRIPTION OF THE DRAWINGS

FIGS. 3, consisting of (a) to (i) and 17, consisting of (a) to (j) are schematic views showing the process for producing the EL device of the present invention;

DESCRIPTION OF THE PREFERRED EMBODIMENTS

Figure 1:
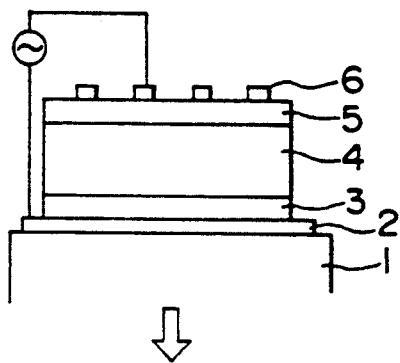
FIGS. 1, 2, 5, 7, 10, 12, 14 and 15 are schematic cross-sectional views of preferred structures of the EL device of the present invention.

The present invention employs a diamond-like carbon film as the light emitting layer and incorporates oxygen atoms in said light emitting layer, thereby providing an EL device which shows an excellent moisture resistance, a long service life and a high luminance even under a low driving voltage, and is capable of light emission in the short wavelength region.

Also the present invention employs a diamond-like carbon film as the light emitting layer and incorporates small amounts of oxygen and another element, thereby providing an EL device of a high luminance and a long service life, capable of covering the entire visible wavelength range.

More specifically, the diamond-like carbon film (hereinafter called DLC film) employed in the present invention is a film principally composed of carbon of $SP^3$ structure, and has a diamond structure over a short distance but may show disordered amorphous character over a longer distance. Such DLC film is preferably a relatively smooth film of properties close to those of diamond, for example substantial transparency to visible light, a resistivity at least equal to $10^{12}$ Ωcm and Vicker's hardness Hv at least equal to 2,000 kg/mm$^2$.

Such DLC film can be formed with various known methods, such as ion beam sputtering, ion beam evaporation, RF plasma CVD, DC glow discharge or ECR plasma CVD.

The diamond-like carbon (DLC) film employed in the present invention has to be transparent to the color of the light to be emitted, and has Egopt at least equal to 1.5 eV, preferably at least equal to 2.0 eV in order to cover the visible wavelength region. Also in order to have a sufficient insulation voltage and to sufficiently accelerate the electrons for exciting the light emitting centers, the resistivity is preferably at least equal to $10^9$ Ωcm, more preferably in a range from $10^9$ to $10^{12}$ Ωcm. Also the film is preferably chemically stable and free from deterioration of the film quality.

Different from carbon black or glassy carbon, such DLC film has a low content of $SP^2$ carbons in the film, and a low content of conjugate double bond systems. Consequently the film is principally composed of $SP^3$ carbon atoms, and has the diamond structure in the short distance, though it may be amorphous over a long distance. The presence or absence of crystalline structure observed by ED or the like is not critical in the present invention.

As already explained before, such DLC film can be prepared by sputtering, a PVD method such as ion beam evaporation, or a CVD method such as RF plasma CVD or DC glow discharge method.

Oxygen can be incorporated into the DLC film for example by employing raw material gas containing carbon and oxygen for example an alcohol such as $CH_3OH$ or $C_2H_5OH$, a ketone such as $(CH_3)_2CO$ or $(C_6H_5)CO$, or CO or $CO_2$; by forming the DLC film in gaseous atmosphere or plasma containing oxygen such as $O_2$ or $H_2O$; or oxidizing the DLC film in atmosphere of plasma of $O_2$ of $H_2O$. The oxygen content should not exceed 5 atom. % and is preferably at least equal to 0.1 atom. %. A content exceeding 5 atom. % provides an unstable structure deteriorating the repetition durability, and reduces the film forming speed in case oxygen-containing gas is used in mixture. On the other hand, a content less than 0.1 atom. % reduces the intensity of emitted light.

The DLC film employed in the present invention, having Egopt at least equal to 2.0 eV as explained before, can increase the number of atoms or molecules constituting the light emitting centers, thus enabling multi-color light emission. Also because of the resistivity at least equal to $10^9$ Ωcm, the film has a high insulation voltage for sufficiently accelerating the electrons for exciting the light emitting centers. Consequently said centers can be efficiently excited to provide a high luminance. Also the device of a long service life can be obtained since the DLC film is chemically stable and is not affected by the temperature or circumferential atmosphere.

Now the present invention will be clarified in greater detail by preferred embodiments thereof.

Figure 2:
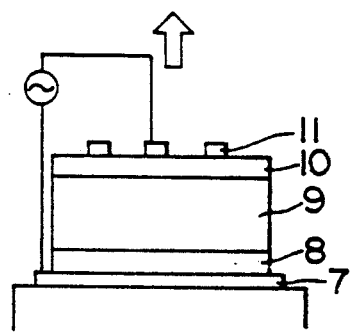

FIGS. 1 and 2 are cross-sectional views showing a preferred structure of the EL device of the present invention. A substrate 1 is composed of a transparent material such as glass or quartz, or a high-melting metal or semiconductor in the form of a bulk or a film such as Si(n+), W, Au, Cr, Ta or Mo. Said substrate has to be stable at the temperature of DLC film formation, for example from room temperature to 500° C. In case it is composed of a metal or a semiconductor, it serves as a reflecting layer for the emitted light and an electrode for the EL device. A transparent conductive film (first conductive layer) 2 is composed, for example, of ITO, $SnO_2$, ZnO, $SnO_2$-Sb or $Cd_2SnO_4$ with a thickness of 500 to 1,500 Å and is formed by vacuum evaporation, ion plating, sputtering, spraying or CVD. An insulating layer 3 is advantageously composed of a material which is transparent in the visible wavelength range, and has a high insulation voltage and a high dielectric constant, such as $Y_2O_3$, $HfO_2$, $Si_3N_4$, $Al_2O_3$, $Ta_2O_5$, $PbTiO_3$, $BaTa_2O_5$ or $SrTiO_3$. Said layer is formed with a thickness of 500–1,500 Å, by one of the methods mentioned for the transparent conductive film. A light emitting layer 4, composed of a DLC film formed as explained above, preferably has a thickness of 0.1 to 2 μm. Preferred examples of the gas usable in the preparation of said layer includes hydrocarbons such as methane, ethane, propane, pentane, ethylene, benzene and acetylene, halogenated hydrocarbons such as methylene chloride, carbon tetrachloride, chloroform and trichloroethane, alcohols such as methyl alcohol and ethyl alcohol, and gasses such as $N_2$, $H_2$, $O_2$, $H_2O$ and argon for mixing with the foregoing compounds.

Light emission of a color specific to the light emitting centers can be obtained by mixing a small amount of element constituting such centers. Preferred examples of the element constituting such light emitting centers include, for the short wavelength (purple to blue) region, B, Te, As, Au, Mg, P, Sb, Si, Ta and N; for the long wavelength (orange to red) region, Tl Ba, Li, Cd, Cs, In, Ra, S, Sr, Ti, Zn, Ca, Ce, Co, Cr, Fe, Ga, K, Mn, Nb, Os, Pb, Rb, Rh, Sc, Th, V, W and Y; and, for the intermediate wavelength (green to yellow) region, Ag, Be, Bi, Cu, Ge, Hg, Pt, Re, Zr, Al, Ir, Ni, Ru, Sn and Tb. There can also be used halides, sulfides and oxides of these elements.

Such material constituting the light emitting centers is preferably incorporated in the DLC layer in an amount of 0.1 to 3% with respect to the weight of the DLC film. A content less than 0.1 wt. % will result in lack of light emission, or insufficient luminance or efficiency, while a content exceeding 3 wt. % will again deteriorate the luminance and efficiency.

Such light emitting centers can be incorporated into the light emitting layers by sputtering, for example with an ion beam, from a target composed of said element, or a compound thereof or a mixture thereof, provided in the same vacuum chamber at the formation of said DLC film. Said ion beam can be formed with already known ion gas, such as Ar, He, $N_2$, $O_2$ or $H_2$.

An insulating layer 5 is similar to the insulating layer 3. An electrode (second conductive layer) 6 is advantageously composed of a metal, such as Al, Au, Ag, Pt, W, Cu, Ti or Ni. Said electrode has a thickness of 500 to 1,500 Å and is formed for example by vacuum evaporation, ion plating, sputtering, CVD or electroplating. The electroluminescence is obtained through the glass plate 1, by applying an AC voltage between the electrodes.

In the EL device shown in FIG. 2, there are provided an electrode 7 composed of metal or semiconductor stable at the DLC film forming temperature; an insulating layer 8 similar to the layer 3 shown in FIG. 1; a light emitting layer 9 similar to the layer 4 in FIG. 1; another insulating layer 10 similar to the layer 5 in FIG. 1; and a transparent conductive layer 11 similar to the layer 2 in FIG. 1. Thus the structure shown in FIG. 2 provides electroluminescence from the upper surface.

Depending on the direction of electroluminescence emission, there can be two basic structures: substrate (glass)/transparent conductive layer/insulating layer/light emitting layer/insulating layer/metal electrode (serving also as reflective layer) and substrate/metal electrode (reflective layer)/insulating layer/light emitting layer/insulating layer/transparent conductive layer.

Stated differently, one of the electrodes of the EL device is a transparent conductive film while the other can be a metal or semiconductive electrode, and the arrangement thereof varies according to the desired direction of light emission.

The insulating layer need not necessarily be present on both sides of the light emitting layer but can be provided on one side only. Also a composite structure of said layer provides additional advantages of preventing pinholes or local defects. The insulating layer may have a same thickness or different thicknesses as long as each thickness is within the above-mentioned range.

According to the present invention, there is provided an EL device that can provide light emission of a high luminance even after a prolonged drive, by laminating an insulating layer on at least a side of the light emitting layer consisting of a diamond-like carbon film for enabling sufficient acceleration of the electrons in said light emitting layer, thereby lowering the voltage required to excite the light emitting centers.

Also according to the present invention, there is provided an EL device composed of highly integrated elements of a long service life and a high luminance, capable of covering the entire visible wavelength region, by employing diamond single crystals or polycrystals as the light emitting layer, and selectively forming said crystals with a certain regularity, preferably orienting the (100) crystal plane parallel to the plane of substrate.

Also according to the present invention, there is provided an EL device of a long service life and a high luminance, by employing, as the light emitting layer, a diamond-like carbon film with a smooth surface, preferably a smoothness not exceeding RMS 500 Å thereby preventing generation of local high electric field in the use of the device.

The above-mentioned wide band gap of diamond is theoretically suitable also for realizing blue light emission in p-n junction light emitting devices or in cathode luminescence light emitting devices. However, such p-n junction devices are difficult to realize since n-type diamond is difficult to obtain and p-n junction is therefore extremely difficult to prepare. Also the light emitting devices utilizing cathode luminescence require a vacuum chamber for electron beam emission, and it is difficult to obtain electron beams in stable manner. On the other hand, the EL devices do not require such vacuum system nor n-type conduction, and may be directly used with AC voltage of 100V. This fact is particularly advantageous in the countries where such AC 100V voltage is commercially available.

For increasing the nucleation density of diamond, there is proposed, in the Japanese Patent Publication Sho 62-27039, a method of forming minute scars on the substrate, by means of particles of grinding material.

This method allows to selectively form monocrystals and polycrystals of diamond in desired positions and size. Also it is already known, in the synthesis of diamond crystals, that the direction of crystal plane can be controlled by the conditions of synthesis (Kobashi, Satoh, Yukino, Kamo and Sedaka: Preprints of 33rd Conv. of Soc. of Jap. Appl. Physics p. 285 (spring 1986)).

Thus a light emitting layer of matrix structure having a desired number of pixels can be obtained by regularly forming diamond crystals in desired positions and size. Also the surface of the diamond crystal layer (light emitting layer) can be made smooth by controlling the crystal plane of thus formed diamond crystals.

The (100) plane of diamond crystals, if employed as the surface of the light emitting layer, provides an advantage of a higher light emission intensity than the (111) plane, as revealed in the research of cathode luminescence of diamond, both in the high-pressure synthesized diamond and in the gaseous synthesized diamond.

This is due to a higher concentration of nitrogen, introduced as impurity at the synthesis, in the (100) growth plane than in the (111) growth plane, and a similar phenomenon is observed also in the electroluminescence. Also the (100) plane is softest in the diamond crystal and is suitable for obtaining a flat plane by polishing or dry etching.

Based on detailed investigations and experiments, the present inventors have found that, in the EL device employing a diamond film as the light emitting layer, a better performance can be obtained with a smoother surface.

An EL device employing a diamond film with a smooth surface as the light emitting layer can maintain the initial excellent characteristics even in a prolonged use.

The surface of a diamond thin film can be flattened, for example to a smoothness not exceeding RMS 500 Å, by polishing or etching under specified conditions, or by control of the film forming conditions.

Now the present invention will be clarified in greater detail by preferred embodiments thereof. As will be explained later, these embodiments employ a thin diamond film as the light emitting layer.

FIGS. 1 and 2 are cross-sectional views showing a preferred structure of the EL device of the present invention. A substrate 1 of the EL device is composed of a transparent material such as glass or quartz, or a high-melting metal or semiconductor in the form of a bulk or a film, such as Si(n+), W, Au, Cr, Ta or Mo. Said substrate has to be stable at the temperature of diamond film formation, for example 500° C. to 900° C. In case it is composed of a metal or a semiconductor, it serves as a reflecting layer for the emitted light and an electrode for the EL device. A transparent conductive film (first conductive member) 2 is composed, for example, of ITO, $SnO_2$, ZnO, $SnO_2$-Sb or $Cd_2SnO_4$, but $SnO_2$ is suitable for satisfying the above-mentioned temperature condition. Said transparent conductive film has a thickness of 500 to 1,500 Å, and can be formed for example by vacuum evaporation, ion plating, sputtering, spraying or CVD. An insulating layer 3 is advantageously composed of a material which is transparent in the visible wavelength region, and has a high insulation voltage and a high dielectric constant, such as $SiO_2$, $Y_2O_3$, $HfO_2$, $Si_3N_4$, $Al_2O_3$, $Ta_2O_5$, $PbTiO_3$, $BaTa_2O_6$ or $SrTiO_3$. Said layer is formed with a thickness of 500–1,500 Å, by one of the methods mentioned for the transparent conductive film. A light emitting layer 4, composed of a thin diamond film, is formed by a gaseous growth method such as microwave plasma CVD, heated filament CVD, plasma jet or ECR plasma CVD, preferably with a thickness of 0.1 to 2 μm. Preferred examples of the gas usable in the preparation of said layer includes saturated linear hydrocarbons such as methane, ethane, propane and pentane, unsaturated hydrocarbons such as ethylene, benzene, naphthalene and acetylene, halogenated hydrocarbons such as methylene chloride, carbon tetrachloride, chloroform and trichloroethane, alcohols such as methyl alcohol and ethyl alcohol, and gases such as $N_2$, $H_2$, $O_2$, $H_2O$ and argon for mixing with the foregoing compounds.

In addition to the foregoing, there may also be employed a saturated linear hydrocarbon such as methane, ethane, propane or pentane, or an unsaturated hydrocarbon such as benzene, naphthalene or acetylene, which is partly substituted with —OH, —C=O, —CHO, —C≡N or —$NH_2$.

Light emission of a color specific to the light emitting centers can be obtained by mixing a small amount of element constituting such centers. Preferred examples of the element constituting such light emitting centers include, for the short wavelength (purple to blue) region, B, Te, As, Au, Mg, P, Sb, Si, Ta and N; for the long wavelength (orange to red) region, Tl, Ba, Li, Cd, Cs, In, Ra, S, Sr, Ti, Zn, Ca, Ce, Co, Cr, Fe, Ga, K, Mn, Nb, Os, Pb, Rb, Rh, Sc, Th, V, W and Y; and, for the intermediate wavelength (green to yellow) region, Ag, Be, Bi, Cu, Ge, Hg, Pt, Re, Zr, Al, Ir, Ni, Ru, Sn, Tb and 0. There can also be used halides, sulfides and oxides of these elements.

The diamond layer can be doped with the light emitting centers, if the doping material is gaseous, by employing doping gas containing the element constituting light emitting centers at the formation of the diamond film. If the doping material is liquid, it is gasified by a bubbling apparatus. If it is solid, it can be incorporated by thermal sublimation or by sputtering.

The impurity for constituting the light emitting centers to be introduced in the light emitting layer for modifying the color of emitted light can be relatively easily introduced, as explained before, in the course of gaseous deposition of diamond, and can be distributed in a desired concentration in the direction across said film.

The light emitting centers are not limited to these atoms or molecules different from diamond, but can also be composed of lattice defects of the diamond crystal itself, such as crystal defects, transition points or distortion points.

However the method of introducing a material constituting the light emitting centers is practically preferable, as it is easier than the control of the kind and concentration of such defects.

In addition to the foregoing, there may naturally be employed other already known doping methods.

The ratio (IE/IC) of the light emitting centers such as atoms, molecules or crystal defects to the carbon atoms constituting the matrix crystal is desirably in a range from $5\times10^{-2}$ to $1\times10^{-5}$, preferably from $1\times10^{-2}$ to $1\times10^{-4}$. A ratio exceeding $5\times10^{-2}$ may result in a distortion of the diamond lattice, whereby it may become unable to sufficiently accelerate the electrons for exciting the light emitting centers. Also an IE/IC ratio lower than $10^{-5}$ will result in a low light emission intensity. Also in introducing atoms of a relatively large atomic radius with enhanced ion bonding character rather than the covalent bonding character, the IE/IC ratio is preferably maintained not exceeding $1\times10^{-2}$ in order not to destruct the crystal lattice of diamond.

Also the transition probability of light emission for d electrons is generally about 1/100 of that for s and p electrons, so that the IE/IC ratio is preferably selected as $1\times10^{-4}$ or higher for the light emitting centers with d electrons or those in which transition by light is prohibited.

In FIG. 1, an insulating layer 5 is similar to the insulating layer 3. An electrode (second conductive layer) 6 is advantageously composed of a metal such as Al, Au, Ag, Pt, W, Cu, Ti or Ni. Said electrode has a thickness of 500 to 1,500 Å and is formed for example by vacuum evaporation, ion plating, sputtering, CVD or electroplating. Thus the electroluminescence is obtained through the glass plate 1, by applying an AC voltage between the electrodes.

In the EL device shown in FIG. 2, there are provided an electrode 7 composed of metal or semiconductor stable at the diamond forming temperature; an insulating layer 8 similar to the layer 3 shown in FIG. 1; a light emitting layer 9 similar to the layer 4 in FIG. 1; another insulating layer 10 similar to the layer 5 in FIG. 1; and a transparent conductive layer 11 similar to the layer 2 in FIG. 1. Thus the structure shown in FIG. 2 provides electroluminescence from the upper surface.

Depending on the direction of electroluminescence emission, there can be two basic structure: substrate (glass)/transparent conductive layer/insulating layer/light emitting layer/insulating layer/metal electrode (serving also as reflective layer) and substrate/metal electrode (reflective layer)/insulating layer/light emitting layer/insulating layer/transparent conductive layer.

Stated differently, one of the electrodes of the EL device is a transparent conductive film while the other can be a metal or semiconductive electrode, and the arrangement thereof varies according to the desired direction of light emission.

The insulating layer need not necessarily be present on both sides of the light emitting layer but can be provided on one side only. Also a composite structure of said layer provides additional advantages of preventing pinholes or local defects. The insulating layer may have a same thickness or different thicknesses as long as each thickness is within the above-mentioned range.

FIG. 3 illustrates a preferred method for producing the EL device of the present invention. At first, on a substrate 401 composed of glass or quartz, a transparent conductive film 402 of ITO, $SnO_2$, ZnO, SbO or $Cd_2SnO_4$ is formed with a thickness of 500–1,500 Å for example by vacuum evaporation, ion plating, sputtering, spraying or CVD (FIG. 3(a)). Then a photoresist layer 403 is formed in the size of pixels, and the transparent conductive film 402 is etched in stripes by IBE, IBAE, RIE, RIBE, etc. (FIG. 3(b)). Then a dielectric layer 404 of a high dielectric constant and a high insulation voltage, composed for example of $SiO_2$, $Y_2O_3$, $HfO_2$, $Si_3N_4$, $Al_2O_3$, $Ta_2O_5$, $PbTiO_3$, $BaTa_2O_6$ or $SrTiO_3$ is formed corresponding to the thickness of the transparent conductive film 402, for example by vacuum evaporation, ion plating, sputtering, spraying or CVD, and then the resist layer 403 is removed (FIG. 3(c)). Then an insulating layer 405 of the aforementioned dielectric material is formed by the aforementioned method (FIG. 3(d)), and etching is conducted with a photolithographic process, employing a mask pattern of a desired pixel size and a resist layer 406. The thickness of the dielectric layer 405 is so adjusted that a thickness of 500 to 5,000 Å is left after the etching of 1 to 2 μm (FIG. 3(e)). While the resist layer 406 is not removed, the substrate is immersed in alcohol in which diamond grinding particles are dispersed and is subjected to ultrasonic treatment for forming scars only in the etched portions (FIG. 3(f)). Then diamond crystals 407 are gaseous synthesized for example by microwave plasma CVD, heated filament CVD, plasma jet, ECR plasma CVD etc. (FIG. 3(g)).

The gas used in this step is carbon-containing gas, for example a hydrocarbon such as methane, ethane, propane, ethylene, benzene or acetylene; a halogenated-carbon such as methylene chloride, carbon tetrachloride, chloroform or trichloroethane; and alcohol such as methyl alcohol or ethyl alcohol; or gas such as $CO_2$ or CO and inert gas such as $N_2$, $H_2$, $O_2$, $H_2O$ or Ar. In the film forming apparatus of the present inventors, a gas system of $CH_4$ and $H_2$ with a methane concentration of 1 to 3% provided diamond crystals of which (100) plane grew substantially parallel to the substrate. In said range of methane concentration, the (100) plane is not perfectly parallel, but it may be partially inclined. Also the (111) and (110) planes may be slightly mixed. In this step the diamond crystals with the (100) plane parallel to the substrate are grown into a thickness of 1–2 μm under the above-mentioned conditions. Then formed is an insulating layer 408 composed of the aforementioned dielectric material (FIG. 3(h)). Finally an electrode layer 409, composed of Al, Au, Ag or Pt, is formed, on the light emitting diamond layer 407, with a thickness of 500 to 1,500 Å and in stripe orthogonal to the patterns of the transparent conductive film 402 (FIG. 3(i)).

Figure 4:
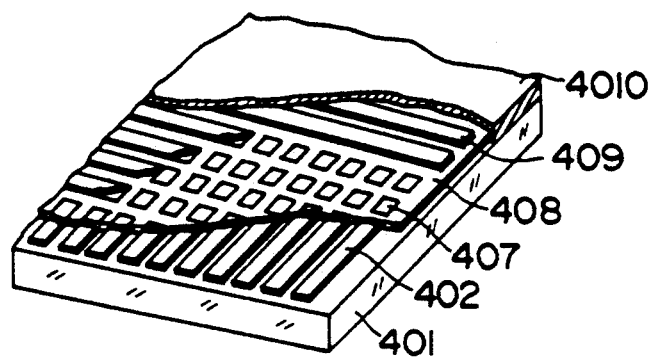
FIG. 4 is a partially cut-off perspective view of a preferred structure of the EL device of the present invention.

FIG. 4 is a partially cut-off perspective view of a preferred embodiment of the EL device panel of the present invention, wherein shown are the quartz substrate 401, $SnO_2$ transparent electrodes 402 (in Y direction), light emitting layer 407 composed of diamond crystals, insulating layer 408, aluminum electrodes 409, and protective layer 4010.

At the formation of diamond crystals constituting the light emitting layer, there can be mixed, as explained above, a small amount of an element constituting the light emitting centers, thereby obtaining the light emission of a color specific to said light emitting centers. Suitable elements for such light emitting centers are already explained above.

The light emitting layer can be composed of a single diamond crystal, by suitable adjustment of the mask pattern size. The size of the light emitting layer (light emitting area) in such case is about 1 μm² at minimum. It is therefore possible to obtain an EL matrix panel of a high resolution, with a pixel size of about 1 μm².

The insulating layers sandwiching the light emitting layer may have a same thickness or different thicknesses, as long as it is within the range mentioned above. Also said insulating layer is not limited to a single layer but may be composed of two or more insulating films.

Also in this case, the EL device can have two basic structure according to the desired direction of light emission: substrate (glass)/transparent conductive layer/insulating layer/light emitting layer/insulating layer/metal electrode (serving also as reflective layer), and substrate/metal electrode layer (reflective layer)/insulating layer/light emitting layer/insulating layer/transparent conductive layer.

In the following there will be given a more detailed explanation on the surface flattening method, kind of impurity constituting the light emitting centers, film forming method, doping method of the impurity constituting the light emitting centers, and structure of the layer containing the impurity constituting the light emitting centers.

The thin diamond film constituting the light emitting layer preferably has a smooth surface in order to obtain stable light emission of a high luminance over a prolonged period.

More specifically, the surface coarseness is preferably RMS 500 Å or lower, more preferably RMS 450 Å or lower, and most preferably RMS 400 Å or lower.

The thin diamond film, deposited by a known diamond forming method such as microwave CVD or filament method can be flattened by ion beam etching or by polishing with a metal such as iron or cobalt.

Instead of such etching or polishing, a flat diamond film can be obtained by suitable selection or control of the film forming conditions.

A thin flat diamond film can be obtained by either of the above-mentioned methods.

More specifically, the ion beam etching method is conducted in the following manner. At first, on a thin diamond film with surface irregularities, there is deposited a $Si_3N_4$ film preferably with a thickness of 0.6 to 1 μm. Then the diamond surface, with deposited $Si_3N_4$ thereon, is etched and flattened by an Ar ion beam or an $O_2$ plasma beam. The polishing with iron or cobalt is conducted by rubbing the diamond surface for example with an iron plate heated to about 500° C.

The formation of a flat diamond film by selection or control of film forming conditions is conducted in the following manner, though it depends to a certain extent on the shape, dimension and excitation source of the film forming apparatus.

At first the substrate temperature is preferably 1,000° C. or lower, particularly 500° C. to 700° C. A temperature lower than 500° C. may generate soot instead of diamond, under certain film forming conditions. On the other hand, a temperature exceeding 700° C. tends to enhance the surface irregularities of the formed polycrystalline diamond film, and a temperature exceeding 1,000° C. generates a diamond film with marked irregularities, including clearly observable crystal faces. Thus a substrate temperature at least equal to 500° C. and not exceeding 700° C. is desirable for obtaining a flat diamond film through the selection of substrate temperature only, in the gaseous film formation.

The film forming gas is generally composed of hydrogen gas and carbon-containing gas. The ratio of carbon atoms with respect to $H_2$ is generally in a range of 0.005–0.02, but, for obtaining a flat diamond film, is selected in a range from 0.03 to 0.06. A ratio higher than 0.06 may generate soot without adhesion on the substrate, instead of diamond.

The pressure is preferably at least equal to 50 Torr, more preferably at least equal to 100 Torr, since a pressure lower than 50 Torr may result in soot formation.

The surface coarseness of thus flattened diamond film was measured with a contact surface coarseness meter (Tencor Instruments Inc.; Alpha-step 200). In the present invention, the surface coarseness was measured over a length of 2 mm at each of 10 points equally spaced from an end to the other of the film, and the values obtained at said 10 points were averaged as the averaged surface coarseness RMS.

Figure 5:
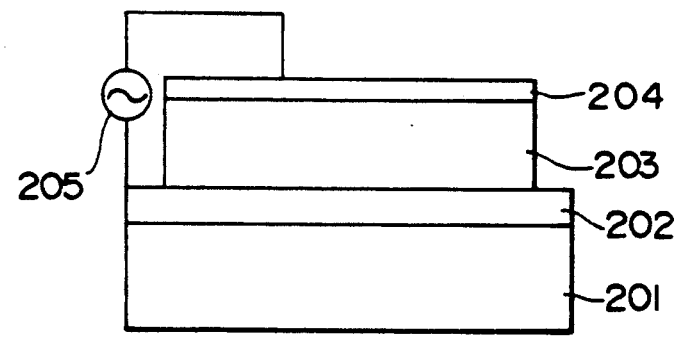

FIG. 5 shows another preferred structure of the EL device of the present invention. In the present embodiment, as shown in FIG. 5, the thin diamond film is not sandwiched between insulating layer. In the present embodiment, the drawbacks resulting from the surface irregularities of the diamond film are fundamentally eliminated by suppressing said irregularities, as will be explained in the following with reference to the attached drawings.

In FIG. 5 there are shown a transparent substrate 201 composed for example of quartz or translucent alumina ceramics; a transparent electrode 202 composed for example of $SnO_2$ or ITO ($In_2O_3 + SnO_2$); a diamond layer 203, an electrode 204 composed of one or plural metals; and an AC or DC voltage source 205.

In the present embodiment, the thickness of the light emitting layer consisting of a thin diamond film has to be carefully controlled. The light emitting layer has to provide a sufficiently high light emission intensity even with a power source of a relatively low voltage, and has to be free from destruction of insulation. For this purpose the thickness of said layer is preferably in a range of 0.5–5 μm, more preferably 0.7–3 μm and ideally 1–2 μm.

In the EL device of the present embodiment, the electrode formed on the light emitting layer of diamond film is preferably in contact with said light emitting layer over the entire area thereof, in order to prevent the generation of local high electric field and to prevent destruction of insulation, at the voltage application.

Also the distribution of the atoms constituting the light emitting centers in the light emitting layer should be substantially uniform in a plane parallel to the substrate, though it may be uniform or uneven in the direction across said layer.

For obtaining a higher light emission intensity, the atoms constituting the light emitting centers should preferably be present with a higher concentration at the electrode side, in order that the electrons accelerated by the electric field can efficiently excite the light emitting centers.

In the present invention, the thin diamond film can be formed by known gaseous methods as disclosed in the Japanese Laid-Open Patents Sho 58-51100 and Sho 58-110494 and the Japanese Patent Publication Sho 61-2632. However such methods are not limitative, and any method of synthesis may be employed as long as a flat thin diamond film can be finally obtained and a device structure as explained above can be finally obtained.

Also according to the present invention, there may be combined the flattening of the thin diamond film and the structure involving insulating layers, and such combination is effective for further preventing the generation of local high electric field.

In the following the present invention will be further clarified by embodiments and comparable examples.

EXAMPLE 1

Figure 6:
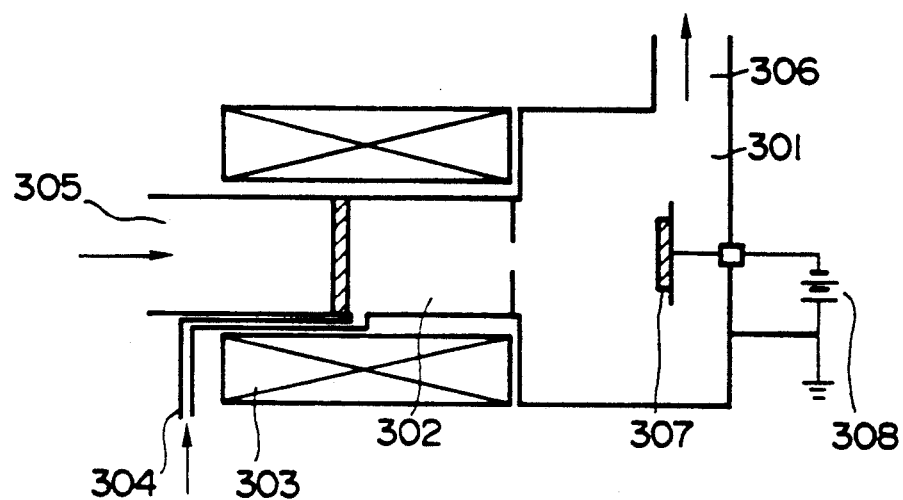
FIGS. 6, 11, 13 and 16 are schematic views of apparatus employed in the preparation of the EL device of the present invention.

FIG. 6 schematically shows an apparatus employed in the preparation of the EL device of the present invention, in which a raw material gas and microwave are introduced into cavity oscillator 302 under the presence of a magnetic field to cause a discharge, and the film formation is conducted on a substrate 307, provided in a film forming chamber 301, by the plasma emitted from the cavity oscillator 302.

A mixture of $CH_4/H_2/O_2$ at a ratio 1:1:0.1 was introduced as the raw material gas with microwave of 2.45 GHz of a power of 200W. Discharge was caused by a magnetic field with a maximum intensity of 1,500 Gauss, and with an intensity of 875 Gauss satisfying the ECR condition at 1 cm inside the exit end of the cavity oscillator. The pressure was 0.05 Torr, and the substrate temperature was 200° C.

Figure 7:
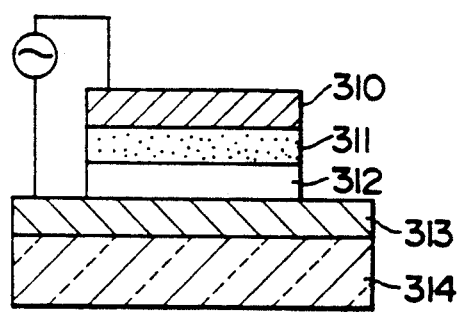

FIG. 7 shows the structure of the EL device of the present invention. On a glass substrate 314, there were formed, in succession, an ITO transparent electrode 313 of a thickness of 1,000 Å, a $HfO_2$ insulating film of a thickness of 2,000 Å, a light emitting layer 311 consisting of an oxygen-containing DLC film of a thickness of 0.8 μm, and an Al rear electrode 310 of a thickness of 1,000 Å formed by vacuum evaporation.

Figure 8:
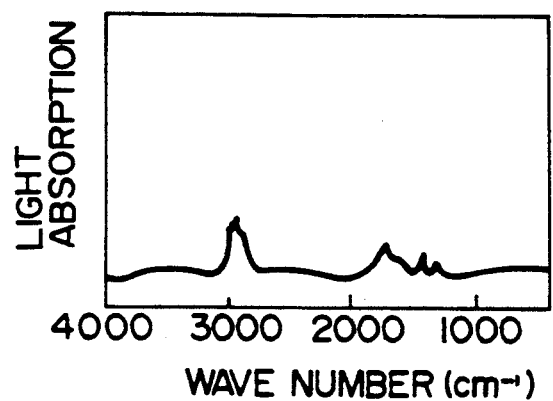
FIG. 8 is a chart showing the infrared absorption spectrum of a DLC film.
Figure 9:
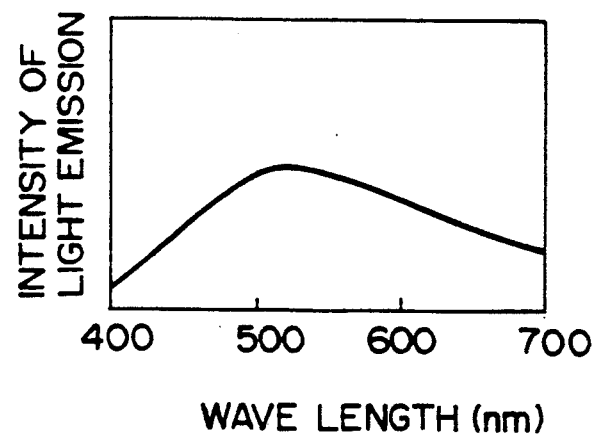
FIG. 9 is a chart showing the emission spectrum of an example of the EL device.

FIG. 8 shows the IR spectrum of the DLC film, which has a —C=O absorption around 1,700 cm$^{-1}$, indicating stable presence of oxygen in the film. The DLC film showed an oxygen content of 1 atom. % by combustion analysis, and Egopt equal to 2.8 eV. Under the application of an AC voltage to the device, the light emission started at 100V and reached saturation at 200V. the emitted light was yellowish green as indicated by the emission spectrum shown in FIG. 9.

EXAMPLE 2

In an apparatus same as in the Example 1, a substrate of the composition same as in the Example 1 (glass-/ITO/$HfO_2$) was used with $CH_4$ gas as the raw material. There were employed microwave of 100W and a magnetic field same as in the Example 1 with a pressure of $5 \times 10^{-4}$ Torr to cause a discharge, thereby forming a light emitting layer. The substrate was maintained at 200° C., and given a bias voltage of −400V. The discharge was stopped after film formation of 1 μm, and the substrate was maintained at 80° C. for 40 hrs. under introduction of oxygen gas supplied by bubbling through water. An Al electrode was formed thereafter. The obtained DLC film showed an Egopt of 2.3 eV. Light emission as in the Example 1 was obtained by applying a same AC voltage as in the Example 1 between the electrodes of the device. The light emitting layer showed an oxygen content of 3 atom. %. once the —C=O absorption peak in the IR spectrum reached saturation, the light emission intensity did not decrease even after one month.

REFERENCE EXAMPLE 1

An EL device was prepared with the DLC film formed as in the Example 2, however without oxidation after the discharge was terminated. The obtained DLC film did not show the —C=O peak. The obtained EL device showed certain light emission under the same conditions as in the Example 1, but the luminescence was lens than 1/100 in comparison with that in the Example 1 or 2.

EXAMPLE 3

A DLC film was formed in the same apparatus and under the same conditions as in the Example 1, except that a 1:1 mixture of $C_2H_4$/CO was used as the raw material gas, with a pressure of $9 \times 10^{-3}$ Torr and the substrate was given a bias voltage of −100V. Egopt was 2.2 eV. After the formation of an Al electrode, the device showed, under the same conditions as in the Example 1, an emission spectrum similar to that shown in FIG. 9. The oxygen content of the film was 5 atoms. %. The half-peak time of attenuation of emission intensity was 5,000 hours.

EXAMPLE 4

Figure 10:
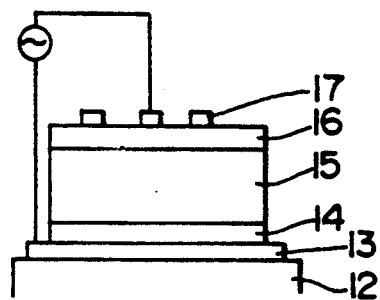

FIG. 10 is a cross-sectional view of a preferred structure of the EL device of the present invention.

Figure 11:
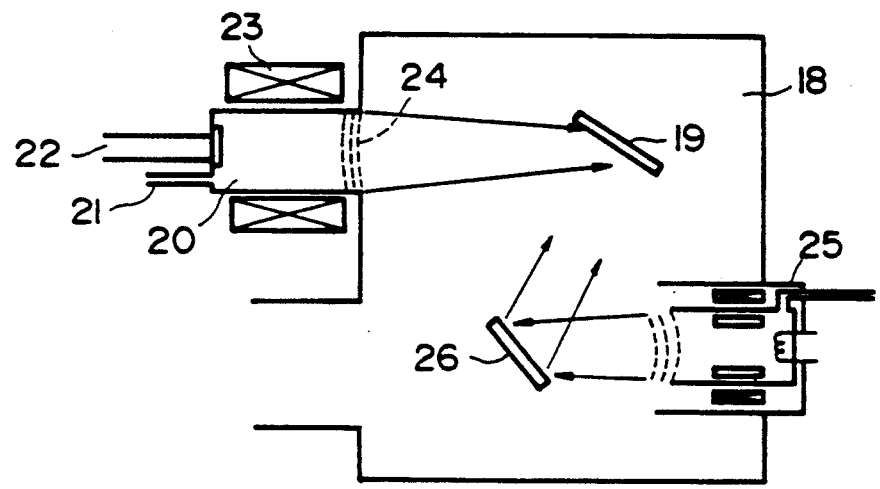

At first, on a quartz substrate 12, an ITO film 13 of a thickness of 1,000 Å was formed by ion plating. Then a $HfO_2$ layer 14 of a thickness of 2,000 Å was formed thereon by reactive evaporation. Then the formation of a DLC film and the doping of light emitting centers were simultaneously conducted in a film forming apparatus shown in FIG. 11. The substrate 19 was placed in a film forming chamber 18. $CH_4$ at 25 sccm and $H_2$ at 25 sccm were introduced from a gas supply system 21 into a plasma generating chamber 20, and microwave of 2.45 GHz with a power of 200W was introduced from a microwave oscillator 22. Also an external magnetic field 23 was so applied as to obtain an intensity of 875 Gauss in the vicinity of exit of said plasma generating chamber. A DLC film was formed on the substrate, maintained at 300° C., by extracting the ion beam by means of an electrode, with an accelerating voltage of 500V, positioned close to the exit of said plasma generating chamber. At the same time an Ar iron beam was generated by introducing Ar gas into a Kaufmann ion source 25 and irradiated a Te target 26 for effecting sputtering. The pressure was maintained at $5 \times 10^{-4}$ Torr, and the Te concentration was regulated at 0.5 wt. %. Subsequently formed were a $HfO_2$ layer 16 of a thickness of 2,000 Å by reactive evaporation, and Al electrodes of a size of 5 mmφ and a thickness of 1,000 Å by vacuum evaporation.

Under the application of an AC voltage of 2 kHz between the electrodes 13 and 17 of the EL device, the light emission started at 100V and reached saturation at 200V. The emitted color was bluish white.

When driven with a voltage of 3 kHz and 100V, the device showed a luminescence of 10 fL and a half-peak attenuation time in excess of 5,000 hours.

EXAMPLE 5

An EL device was prepared in the same manner as in the Example 4, except that Tb was employed as the material for light emitting centers, with a concentration of 0.3 wt. %. When an AC voltage of 4 kHz was applied to the EL device, the light emission started at 120V and reached saturation at 200V, with green color. When driven at 200V, the device showed a luminescence of 200 fL and a half-peak attenuation time in excess of 5,000 hours.

EXAMPLE 6

An EL device was prepared in the same manner as in the Example 4, except that Mn was employed as the material for light emitting centers, with a concentration of 0.5 wt. %. When an AC voltage of 5 kHz was applied to the EL device, the light emission started at 150V and reached saturation at 200V, with red color. When driven at 200V, the device showed luminescence of 100 fL and a half-peak attenuation time in excess of 5,000 hours.

EXAMPLE 7

Figure 12:
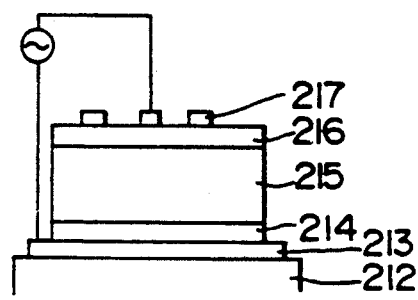
Figure 13:
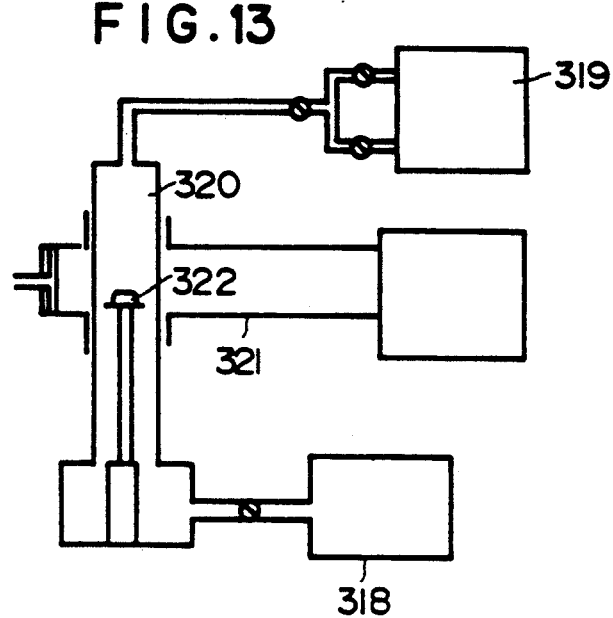

FIG. 12 is a cross-sectional view of the EL device of the present embodiment.

t first, on a quartz substrate 212, a $SnO_2$ film 213 of a thickness of 1,000 Å was formed by ion plating. Then a $HfO_2$ layer 214 of a thickness of 2,000 Å was formed thereon by reactive evaporation. Then the substrate was immersed in alcoholic dispersion of diamond grainding particles of 15 μm in particle size, and subjected to ultrasonic treatment for generating scars on the $HfO_2$ layer only. After sufficient washing, the substrate was placed in a microwave plasma CVD apparatus shown in FIG. 13, and the interior was evacuated to a pressure of $1 \times 10^{-7}$ Torr by an evacuating system 318. There were supplied $CH_4$ at 0.7 sccm, $H_2$ at 98.8 sccm and a mixture of trimethyl aluminum of 0.2% in hydrogen carrier gas at 0.5 sccm from a gas supply system 319 into a reaction chamber 320, with a pressure of 40 Torr in the apparatus. Also microwave of 2.45 GHz was supplied by a wave guide 321 to cause microwave discharge, thereby forming a polycrystalline diamond layer 315 of a thickness of 2 μm. The substrate was maintained at 800° C., and the aluminum concentration was regulated at 0.3 wt. %. Subsequently formed were a $HfO_2$ layer 316 of a thickness of 2,000 Å by reactive evaporation, and aluminum electrodes 317 of a thickness of 1,000 Å and of a size of 5 mmφ by vacuum evaporation. When an AC voltage of 1 kHz was applied between the electrodes 13 and 17 of the EL device, the light emission started at 80V and reached saturation at 150V. The emitted color was green, with a peak wavelength at 550 nm.

When driven with a voltage of 100V and 1 kHz, the EL device showed a half-peak attenuation time in excess of 10,000 hours and a luminescence intensity more than doubled in comparison with an EL device without insulating layer.

EXAMPLE 8

Figure 14:
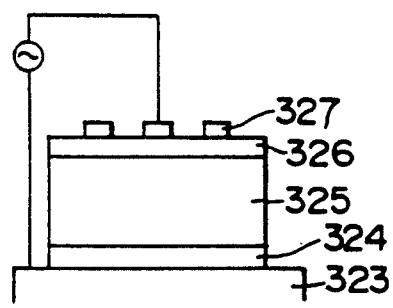
Figure 15:
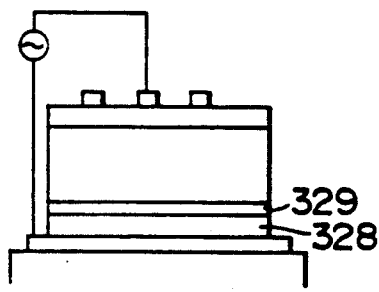

An EL device of the structure shown in FIG. 14 was prepared by employing a Si(n+) substrate 323, on which formed were a HfO$_2$ insulating layer 324 as in the Example 7 and a light emitting diamond layer 325 in a microwave PCVD apparatus shown in FIG. 15. A polycrystalline diamond layer of a thickness of ca. 2 μm was formed by introducing CH$_4$ at 0.5 sccm, H$_2$ at 99.4 sccm and a 0.1% mixture of trimethyl tellurium in hydrogen carrier gas at 0.1 sccm. The Te concentration was regulated at 0.2 wt. %. Subsequently formed were a HfO$_2$ insulating layer 326 and ITO electrodes 327 of a size of 5 mmφ. When an AC voltage of 2 kHz was applied between the electrodes of the EL device, the light emission started at 80V and reached saturation at 200V. The emitted color was blue, with a peak wavelength at 475 nm.

EXAMPLE 9

An EL device was prepared in the same manner as in the Example 7, except that there were introduced CH$_4$ at 0.5 sccm, H$_2$ at 99 sccm and a 0.1% mixture of tetramethyl tin in hydrogen carrier gas at 0.5 sccm for the diamond film formation. The Sn concentration was regulated at 1 wt. %. Under application of an AC voltage of 1 kHz between the electrodes of the EL device, the light emission started at 100V and reached saturation at 200V. The emitted light was green, with a peak wavelength at 550 nm.

EXAMPLE 10

An EL device was prepared in the same manner as in the Example 7, except that the insulating layer 314 was composed of a HfO$_2$ layer 328 and an Al$_2$O$_3$ layer 329 (FIG. 15) in the order from the substrate, and that there were introduced CH$_4$ at 0.5 sccm, H$_2$ at 99 sccm and a 0.2% mixture of dimethyl zinc in hydrogen carrier gas at 0.5 sccm for obtaining a diamond layer of 1.5 μm in thickness. The zinc concentration was regulated at 1 wt. %. When an AC voltage of 1 kHz was applied between the electrodes of the EL device, the light emission started at 100V and reached saturation at 200V. The emitted light was red, with a peak wavelength at 620 nm.

EXAMPLE 11

FIG. 3 shows the flow of a process for preparing the EL device of the Example 11. At first, on a quartz substrate 401, there was formed a SnO$_2$ layer 402 of a thickness of 1,000 Å by ion plating (FIG. 3(a)). Then a resist layer 403 was formed and was photolithographically patterned into stripes of an L/S (line/space) size of 100 μm, and the SnO$_2$ layer 402 was etched by RIE method (FIG. 3(b)). While the resist layer 403 was left on the SnO$_2$ layer 402, a SiO$_2$ layer 404 was formed in the same thickness as that of the SnO$_2$ layer 402, and the resist layer 403 was then removed (FIG. 3(c)). Then a HfO$_2$ film 405 was formed with a thickness of 2 μm by ion plating (FIG. 3(d)). Subsequently a negative rubber resist layer 406 was formed and patterned with a mask pattern of 100×100 μm, and the HfO$_2$ layer 405 was etched to a depth of 1.97 μm (FIG. 3(e)). Then ultrasonic treatment was conducted for 2 hours in alcoholic dispersion of grinding particles of 15 μm in size to generate scars only in the etched portions (FIG. 3(f)).

Figure 16:
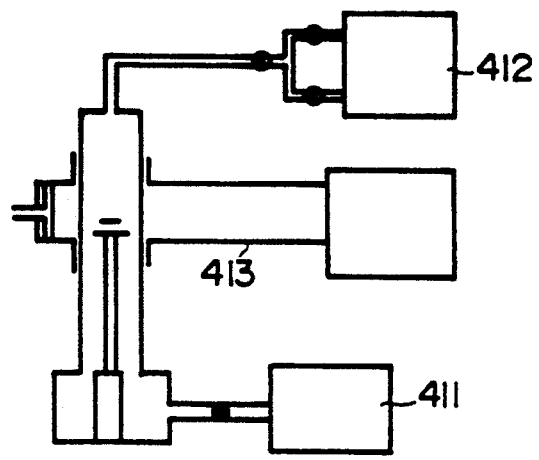

Then, in a microwave plasma CVD apparatus shown in FIG. 16, the interior was at first evacuated to 1×10$^{-7}$ Torr by an evacuating system 411, and there were supplied CH$_4$ at 3 sccm, H$_2$ at 96.5 sccm and a 0.2% mixture of trimethyl tellurium in hydrogen carrier gas at 0.5 sccm from a gas supply system 412 to obtain a pressure of 40 Torr in the apparatus. Simultaneously there was supplied microwave of 2.45 GHz with a power of 350W to form a polycrystalline diamond layer 407 of about 2 μm selectively in the etched portions of the HfO$_2$ layer 405. The substrate was maintained at 850° C., and the Te concentration was regulated at 0.3 wt. %. Then there were formed a HfO$_2$ layer 408 of a thickness of 2,000 Å (FIG. 3(h)), and an Al layer which was patterned in orthogonal relationship to the pattern of the SnO$_2$ layer 402, thereby constituting electrodes 409 on the diamond layer 407. In this manner there was completed an EL device of the present invention, having the light emitting layers of 100×100 μm arranged in a matrix pattern in an area of 25×25 mm. The total number of pixels was 1440. When an AC voltage of 1 kHz was applied between the electrodes of said device, the light emission started at 80V and reached saturation at 150V. The emitted light was bluish white.

EXAMPLE 12

An EL device of the present invention was prepared in a similar manner as in the Example 11, according to the process flow shown in FIG. 17.

Figure 17A:
Figure 17F:
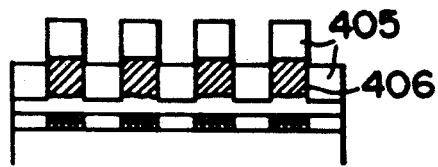
Figure 17B:
Figure 17G:
Figure 17C:
Figure 17H:
Figure 17D:
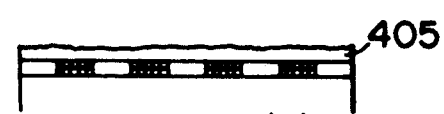
Figure 17I:
Figure 17E:
Figure 17J:

At first, on a quartz substrate 401, there was formed a tungsten (W) layer 402 of a thickness of 500 Å by sputtering (FIG. 17(a)). Then a resist layer 403 was formed, and the W layer 402 was patterned into an L/S size of 100 μm by a photolithographic process and RF sputtering (FIG. 17(b)). Then a SiO$_2$ layer 404 was formed with a thickness of 500 Å, and the resist layer 403 was removed (FIG. 17(c)). After a HfO$_2$ layer 405 was formed with a thickness of 1,500 Å, an ultrasonic treatment was applied in alcoholic dispersion of grinding particles of 15 μm in size, thereby generating scars on the surface of the HfO$_2$ layer 405 (FIG. 17(d)). Subsequently a resist matrix pattern 406 of a thickness of 2 μm and a size of 100×100 μm was formed on the W layer 402 by a photolithographic process and dry etching, and said W layer was etched with Argon ion beam to a depth of 300 Å (FIG. 17(e)). Said etching was conducted with an Ar gas flow rate of 10 sccm, a pressure of 1×10$^{-4}$ Torr and an accelerating voltage of 1 kV. Then the HfO$_2$ layer 405 was again formed with a thickness of 2 μm, and the resist layer 406 was removed (FIG. 17(f), (g)). Subsequently, a polycrystalline diamond layer 407 was selectively formed by microwave PCVD under the same conditions as in the Example 11 (FIG. 17(h)). Then a HfO$_2$ layer 405 was formed with a thickness of 2,000 Å (FIG. 17(i)), and an ITO film was formed and patterned into stripes orthogonal to the pattern of the W layer 402, thereby forming electrodes 409 on the diamond layer 407 (FIG. 17(j)). An EL device of the present invention was completed by attaching a glass plate 4010 as a protective layer, by an adhesive material. When an AC voltage was applied between the electrodes of said device, the light emission started at 80V and reached saturation at 150V. The emitted light was bluish white.

EXAMPLE 13

Figure 18:
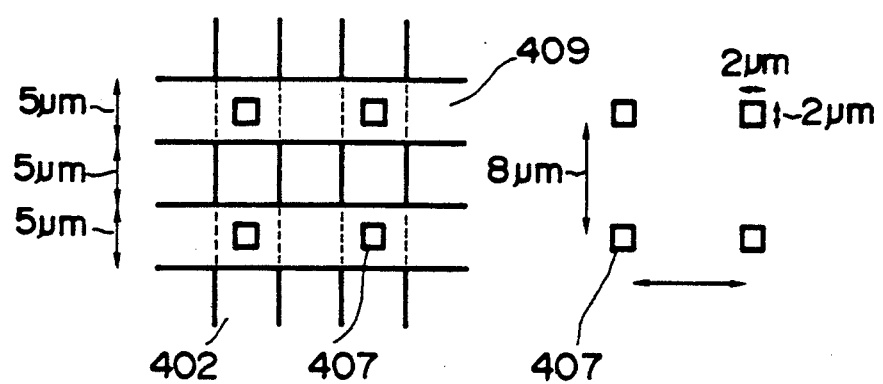
FIG. 18 is a schematic view of a matrix arrangement of the light emitting layer of the present invention.

After a SnO$_2$ layer of a thickness of 1,000 Å was formed on a quartz substrate as in the Example 12, said SnO$_2$ layer was patterned with an L/S size of 2 μm/8 μm by a photolithographic process and dry etching as in the Example 11. Then a HfO$_2$ film was formed with a thickness of 2,000 Å as in the Example 12, and the substrate was immersed in alcoholic dispersion of diamond grinding particles of 15 μm in size and subjected to ultrasonic treatment for generating scars only on the surface of the HfO$_2$ layer. Then a resist layer of a thickness of 2 μm and having a matrix pattern of 2×2 μm, shown in FIG. 18, was formed by a photolithographic process and dry etching. Then etching with Ar ion beam was conducted to a depth of 500 Å. Subsequently a HfO$_2$ layer of 2 μm was formed, and the resist layer was removed, whereby there were obtained scarred holes of 2×2 μm in size. Then a monocrystalline diamond layer of 2 μm in thickness was formed selectively in said holes by microwave PCVD, in the same manner as in the Example 11, by the supply of CH$_4$ at 3 sccm, H$_2$ at 96 sccm and a 0.5% mixture of trimethyl aluminum in hydrogen carrier gas at 1 sccm, with a pressure of 40 Torr and a substrate temperature of 850° C. The aluminum concentration was regulated at 0.3 wt. %. The areas in said holes were smooth, and proved the (100) plane growth parallel to the substrate, as revealed by XD analysis. Thereafter a HfO$_2$ insulating layer and an Al electrode layer were formed as in the Example 11. When an AC voltage of 5 kHz was applied between the electrodes of thus completed device, the light emission started at 80V and reached saturation at 120V. The emitted light was green, with a peak wavelength at 550 nm.

EXAMPLE 14

A quartz plate of a thickness of 0.5 mm, coated with SnO$_2$ in a thickness of 0.2 μm, was immersed in ethanolic dispersion of diamond grinding particles of 15 μm in size and was subjected to ultrasonic treatment for 2 hours. Then a thin diamond film was deposited on thus treated quartz substrate by microwave CVD.

The film forming gas was composed of CH$_4$ and H$_2$, supplied respectively at rates of 5 sccm and 1,000 sccm. The doping was conducted by simultaneously employing three gases of silane, diethyl zinc and trimethyl aluminum. Silane was introduced as a 1,000 ppm mixture with hydrogen and at a rate of 0.5 sccm, diethyl zinc as a 0.2% mixture with hydrogen at 0.5 sccm, and trimethyl aluminum as a 0.5% mixture with hydrogen at 0.4 sccm.

The film formation was conducted with a microwave power of 500W, a substrate temperature of 800° C. and a pressure of 60 Torr.

Film formation for 4 hours provided a diamond light emitting layer with a thickness of 1.5 μm. Then Si$_3$N$_4$ was deposited with a thickness of 7,000 Å by evaporation, and etched with an Ar ion beam, with conditions of an accelerating voltage of 20 kV, a pressure of 4×10$^{-5}$ Torr, a substrate temperature 300° C. and an etching time of 8 hours. After the etching, the film showed a surface coarseness of RMS 450 Å and a thickness of 1 μm. The concentrations of Si, Zn and Al, determined by SIMS (secondary ion mass spectroscopy) were 500, 300 and 400 ppm respectively. These values may contain errors of about 50%, because of the lack of precision in the SIMS analysis.

On the diamond film thus obtained, Ti, Cr and Au were deposited in succession by evaporation, in respective thicknesses of 500, 500 and 1,000 Å as electrode. When an AC voltage of 10 kHz was applied between the Au electrode and SnO$_2$ electrode, white light emission started from 60V and reached saturation at 105V. The light emission intensity was 1,500 fL.

EXAMPLE 15

A thin diamond film was deposited by microwave CVD on a same substrate as employed in the Example 14.

The film forming gases were C$_2$H$_5$OH and H$_2$ at respective flow rates of 15 and 1,000 sccm, and the doping gas was NH$_3$ gas at a flow rate of 0.5 sccm.

Film formation for 4 hours with a microwave power of 400W, a substrate temperature of 750° C. and a pressure of 60 Torr provided a thin diamond film of a thickness of 2 μm. Subsequently Si$_3$N$_4$ was deposited by evaporation, and the obtained film was polished for 5 hours with an iron plate heated to 500° C. After said polishing, the diamond film had a surface coarseness of RMS 430 Å and a thickness of 1.1 μm. The N concentration was 2×10$^3$ ppm according to SIMS analysis.

Then, on said diamond film, there were evaporated in succession Ti, Cr and Au with respective thicknesses of 500, 500 and 1,000 Å as the electrode metals. When an AC voltage of 10 kHz was applied between Au layer and SnO$_2$ layer, blue light emission started at 70V and reached saturation at 120V. The light emission had a peak wavelength at 435 nm and an intensity of 1,700 fL.

EXAMPLE 16

A thin diamond film with a thickness of 1.5 μm was synthesized by W-filament method, utilizing a quartz substrate coated with SnO$_2$ as shown in Example 14, with conditions of a filament temperature of 2100° C., a substrate temperature 840° C., a pressure of 100 Torr and flow rates of CH$_4$ and H$_2$ respectively of 4 and 1,000 sccm. At the same time there was introduced, as the doping gas, a 0.2% mixture of trimethyl tellurium in hydrogen carrier gas at a flow rate of 0.5 sccm. Film formation for 3 hours provided a thin diamond film of a thickness of about 2 μm. Subsequently Si$_3$N$_4$ was evaporated with a thickness of 5,000 Å, and etching was conducted with O$_2$ plasma. After said etching, the film thickness was 1 μm and the surface coarseness was RMS 400 Å. The Te concentration was 2×10$^3$ ppm according to SIMS analysis.

Then, on said thin diamond film, Ti, Cr and Au were evaporated in succession, with respective thicknesses of 500, 500 and 1,000 Å, as the electrode metals. When an AC voltage of 5 kHz was applied between the Au and SnO$_2$ layers, the light emission started at 80V and reached saturation at 120V. The emitted light was blue, with a peak wavelength of 475 nm and an intensity of 1,300 fL.

EXAMPLE 17

A thin diamond film was deposited by microwave CVD on a substrate same as used in the Example 14.

The film forming gases were CH$_4$ and H$_2$, with respective flow rates of 4 and 100 sccm. Trimethyl gallium was employed as the doping gas, with a flow rate of 1 sccm.

Film formation for 3 hours under the conditions of a microwave power of 300W, a substrate temperature of 580° C. and a pressure of 200 Torr provided a thin diamond film with a thickness of 1.3 μm. The surface coarseness was RMS 400 Å. The surface of said diamond film, observed under a scanning microscope, showed a number of quadrangular piramidal crystals with a size of about 1 μm distributed in random manner, and smaller diamonds of secondary nucleation of 200–1,000 Å filling in the gaps between said crystals. The gallium content was 150 ppm according to SIMS analysis.

Then electrodes were formed on said diamond in the same manner as in the Example 16. When an AC voltage of 10 kHz was applied between the Au and SnO$_2$ layers, the light emission started at 80V and reached saturation at 120V. The emitted light was read, with a peak wavelength at 630 nm and an intensity of 900 fL.

EXAMPLE 18

A thin diamond film was deposited by microwave CVD on a substrate same as in the Example 14. Film formation was conducted for 5 hours under the condition of a microwave power of 300W, a substrate temperature of 600° C. and a pressure of 200 Torr, and with gas supply controlled continuously as shown in Tab. 1.

TABLE 1

| Film forma- | Gas flow rate (sccm) | | |
|---|---|---|---|
| tion time | CH$_4$ | H$_2$ | trimethyl Ga |
| 0.5 hrs | 4 | 100 | 1 |
| 2 | 4 | 100 | 0 |
| 1 | 4 | 100 | 1 |

The diamond film, after polished for 40 minutes with an iron plate heated to 500° C., showed a surface coarseness of RMS 350 Å and a thickness of 1.0 μm.

Figure 19:
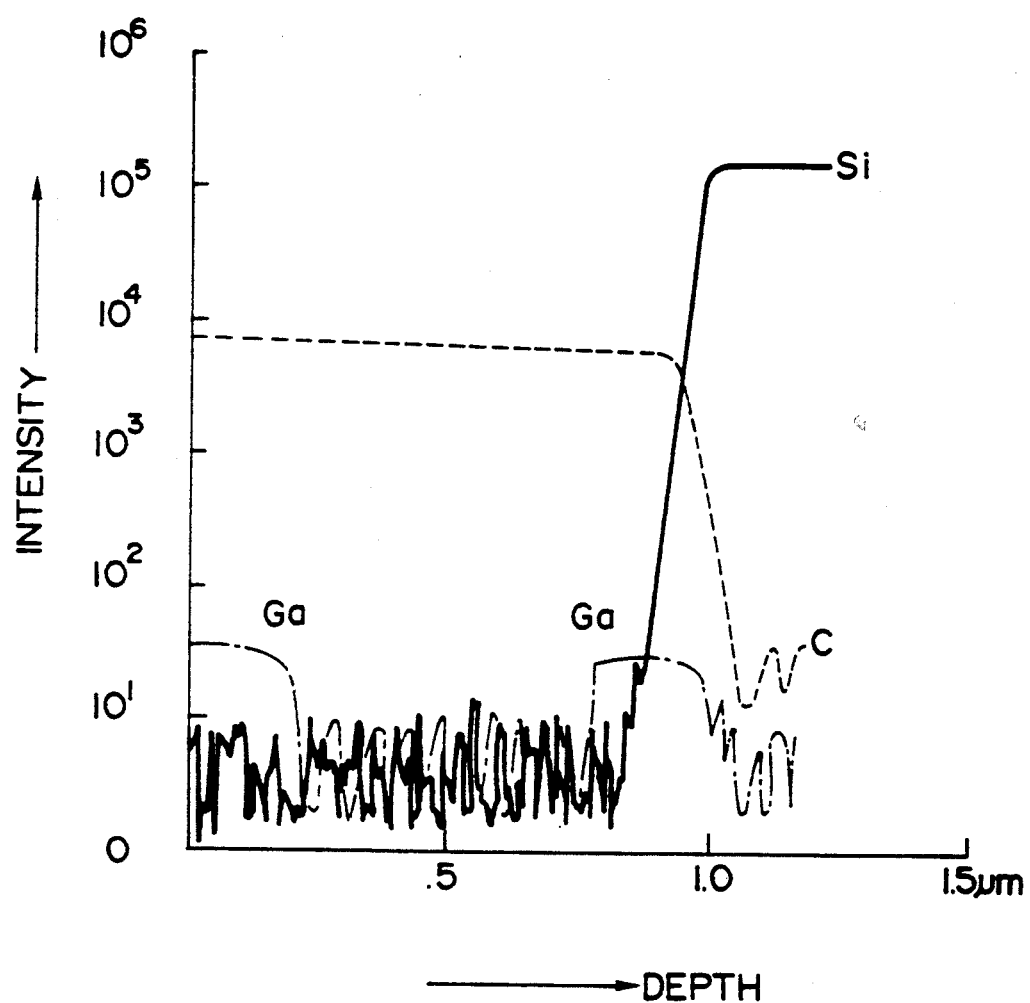
FIG. 19 is a chart of SIMS analysis showing Ga distribution in the light emitting layer of the EL device of the present invention.

The SIMS analysis of Ga in said film provided a result as shown in FIG. 19.

Then electrodes were formed on said diamond film in the same manner as in the Example 16. When an AC voltage of 28 kHz was applied between the Au and SnO$_2$ layers, the light emission started at 85V and reached saturation at 125V. The emitted light was red, with a peak wavelength at 630 nm and an intensity of 1,500 fL.

We claim:

1. An electric field effect light emitting device comprising first and second conductive members and a light emitting layer consisting of a diamond-like carbon film containing oxygen located between said first and second conductive members, wherein the concentration of oxygen is less than about 5 atomic %.

2. A device according to claim 1, wherein said light emitting layer further contains a small amount of an element other than oxygen.

3. A device according to claim 2, wherein said element other than oxygen is present in said light emitting layer in an amount from 0.1 to 3 wt. %.

4. A device according to claim 2, wherein said element other than oxygen is selected from the group consisting of B, Te, As, Au, Mg, P, Sb, Si, Ta, N, halides, sulfides and oxides thereof.

5. A device according to claim 2, wherein said element other than oxygen is selected from the group consisting of Tl, Ba, Li, Cd, Cs, In, Ra, S, Sr, Ti, Zn, Ca, Ce, Co, Cr, Fe, Ga, K, Mn, Nb, Os, Pb, Rb, Rh, Sc, Th, V, W, Y, halides, sulfides and oxides thereof.

6. A device according to claim 2, wherein said element other than oxygen is selected from the group consisting of Ag, Be, Bi, Cu, Ge, Hg, Pt, Re, Zr, Al, Ir, Ni, Ru, Sn, Tb, halides, sulfides and oxides thereof.

7. A device according to claim 1, wherein said light emitting layer is substantially transparent to visible light.

8. A device according to claim 1, wherein said light emitting layer has a resistivity $\geq 10^9$ Ω·cm.

9. A device according to claim 8, wherein said resistivity is in a range from $10^9$ to $10^{13}$ Ω·cm.

10. A device according to claim 9, wherein said resistivity is $\geq 10^{12}$ Ω·cm.

11. A device according to claim 1, wherein said light emitting layer has a Vickers hardness $\geq 2,000$ kg/mm$^2$.

12. An electric field effect light emitting device comprising a first and second conductive members and a light emitting layer consisting of a thin film of monocrystalline or polycrystalline diamond located between said first and second conductive members, further comprising at least one insulating layer between (i) said first conductive member and said light emitting layer or (ii) said second conductive member and said light emitting layer, wherein said light emitting layer contains a small amount of an element constituting light emitting centers.

13. A device according to claim 12, wherein said light emitting layer is substantially transparent to visible light.

14. A device according to claim 12, wherein said second conductive layer is composed of a metal.

15. A device according to claim 14, wherein said metal is selected from Al, Au, Ag, Pt, W, Cu, Ti and Ni.

16. A device according to claim 12, wherein said element constituting light emitting centers is selected from the group consisting of B, Te, As, Au, Mg, P, Sb, Si, Ta, N, halides, sulfides and oxides thereof.

17. A device according to claim 12, wherein said element constituting light emitting centers is selected from the group consisting of Tl, Ba, Li, Cd, Cs, In, Ra, S, Sr, Ti, Zn, Ca, Ce, Co, Cr, Fe, Ga, K, Mn, Nb, Os, Pb, Rb, Rh, Sc, Th, V, W, Y, halides, sulfides and oxides thereof.

18. A device according to claim 12, wherein said element constituting light emitting centers is selected from the group consisting of Ag, Be, Bi, Cu, Ge, Hg, Pt, Re, Zr, Al, Ir, Ni, Ru, Sn, Tb, O, halides, sulfides, and oxides thereof.

19. A device according to claim 12, wherein said insulating layer has a thickness from 500 to 5,000 Å.

20. A device according to claim 19, wherein the diamond light emitting layer has a light emitting area $\geq 1$ μm$^2$.

21. A device according to claim 12, wherein said conductive layers have a thickness from 500 to 1,500 Å.

22. A device according to claim 12, wherein said first conductive layer is a transparent conductive film.

23. A device according to claim 22, wherein said transparent conductive film is composed of a material selected from ITO, SnO$_2$, ZnO, SnO$_2$-Sb and Cd$_2$SnO$_4$.

24. A device according to claim 12, wherein said insulating layer is provided between said light emitting layer and said first conductive layer, and also between said light emitting layer and said second conductive layer.

25. A device according to claim 24, wherein said insulating layers provided between said light emitting layer and said first conductive layer and between said light emitting layer and said second conductive layer have mutually different thicknesses.

26. A device according to claim 12, wherein said insulating layer is composed of a material selected from $Y_2O_3$, $HfO_2$, $Si_3N_4$, $Al_2O_3$, $Ta_2O_5$, $PbTiO_3$, $BaTa_2O_6$, $SiO_2$ and $SrTiO_3$.

27. A device according to claim 12, comprising a protective layer on at least one of said conductive layers.

28. A device according to claim 12, wherein said light emitting layer is selectively formed with regular patterns.

29. A device according to claim 28, wherein the (100) plane of the diamond light emitting layer is oriented parallel to a substrate.

30. A device according to claim 28, wherein said light emitting layer is formed as a two-dimensional matrix.

31. A device according to claim 12, wherein said light emitting layer is selectively formed with regular patterns, and either of said first and second conductive members is formed as stripes.

32. A device according to claim 31, wherein said light emitting layer is formed as a two-dimensional matrix.

33. A device according to claim 12, wherein said insulating layer provided between said conductive member and said light emitting layer is composed of plural layers.

34. An electric field effect light emitting device comprising with a first conductive member, a thin diamond film light emitting layer, and a second conductive member, wherein said diamond film has a substantially flat surface having a surface coarseness not exceeding 500 Å in average, and said light emitting layer is located between said first and second conductive members.

35. A device according to claim 34, wherein said light emitting layer has a thickness from 0.5 to 5 μm.

36. A device according to claim 35, wherein said light emitting layer has a thickness from 0.7 to 3 μm.

37. A device according to claim 36, wherein said light emitting layer has a thickness from 1 to 2 μm.

38. A device according to claim 34, wherein said light emitting layer further contains atoms constituting light emitting centers.

39. A device according to claim 38, wherein said atoms constituting light emitting centers are uniformly distributed in a direction across said layer.

40. A device according to claim 39, wherein said atoms constituting light emitting centers are selected from a group consisting of Ag, Be, Bi, Cu, Ge, Hg, Pt, Re, Zr, Al, Ir, Ni, Ru, Sn, Tb, O, halides, sulfides and oxides thereof.

41. A device according to claim 38, wherein said atoms constituting light emitting centers are unevenly distributed in a direction across said layer.

42. A device according to claim 41, wherein said atoms constituting light emitting centers are more densely distributed at the side of conductive member.

43. A device according to claim 38, wherein said atoms constituting light emitting centers are selected from a group consisting of B, Te, As, Au, Ag, Mg, P, Sb, Si, Ta, N, halides, sulfides and oxides thereof.

44. A device according to claim 38, wherein said atoms constituting light emitting centers are selected from a group consisting of Tl, Ba, Li, Cd, Cs, In, Ra, S, Sr, Ti, Zn, Ca, Ce, Co, Cr, Fe, Ga, K, Mn, Nb, Os, Pb, Rb, Rh, Sc, Th, V, W, Y, halides, sulfides and oxides thereof.

45. A device according to claim 34, wherein said first conductive member is a transparent conductive film.

46. A device according to claim 45, wherein said transparent conductive film is composed of a material selected from ITO, $SnO_2$, ZnO, $SnO_2$-Sb and $Cd_2SnO_4$.

47. A device according to claim 34, wherein said second conductive member is composed of a metal.

48. A device according to claim 47, wherein said metal is selected from Al, Au, Ag, Pt, W, Cu, Ti and Ni.

49. A device according to claim 34, further comprising an insulating layer at least between said light emitting layer and said first or second conductive member.

50. A device according to claim 49, wherein said insulating layer is composed of a material selected from $HfO_2$, $Si_3N_4$, $Al_2O_3$, $Ta_2O_5$, $PbTiO_3$, $BaTa_2O_6$ and $SrTiO_3$.

51. A device according to claim 38, wherein the ratio (IE/IC) of number of said atoms constituting light emitting centers to the carbon atoms in said light emitting layer is within a range from $5 \times 10^{-1}$ to $1 \times 10^{-5}$.

52. A device according to claim 34, wherein the ratio (IE/IC) of number of crystal defects of said light emitting layer to the carbon atoms thereof is within a range from $5 \times 10^{-2}$ to $1 \times 10^{-5}$.

* * * * *

UNITED STATES PATENT AND TRADEMARK OFFICE
CERTIFICATE OF CORRECTION

PATENT NO. : 5,210,430
DATED : May 11, 1993
INVENTOR(S) : YASUSHI TANIGUCHI, ET AL.

It is certified that error appears in the above-identified patent and that said Letters Patent is hereby corrected as shown below:

IN [75] INVENTORS

"Sekimachi" should read --Tokyo; and
"Shioiri" should read --Yokosuka--.

COLUMN 2

Line 36, "the" should read --of the--.

COLUMN 4

Line 60, "includes" should read --include--.

COLUMN 5

Line 5, "Tl" should read --Tl,--.

COLUMN 7

Line 45, "includes" should read --include--.

COLUMN 8

Line 2, "0." should read --O.--.
Line 42, "destruct" should read --destroy--.
Line 68, "structure:" should read --structures:--.

COLUMN 9

Line 58, "inventors," should read --invention,--.

UNITED STATES PATENT AND TRADEMARK OFFICE
CERTIFICATE OF CORRECTION

PATENT NO. : 5,210,430
DATED : May 11, 1993
INVENTOR(S) : YASUSHI TANIGUCHI, ET AL.

It is certified that error appears in the above-identified patent and that said Letters Patent is hereby corrected as shown below:

COLUMN 10

Line 32, "structure" should read --structures--.

COLUMN 11

Line 42, "layer." should read --layers.--.

COLUMN 13

Line 25, "lens" should read --less--.
Line 37, "atoms." should read --atom.--.
Line 62, "iron" should read --ion--.

COLUMN 14

Line 36, "t" should read --At--.
Line 41, "grainding" should read --grinding--.

COLUMN 18

Line 68, "piramidal" should read --pyramidal--.

COLUMN 19

Line 10, "read," should read --red--.
Line 29, "polished" should read --being polished--.

COLUMN 20

Line 13, "a" (first occurrence) should be deleted.

UNITED STATES PATENT AND TRADEMARK OFFICE
CERTIFICATE OF CORRECTION

PATENT NO. : 5,210,430

DATED : May 11, 1993

INVENTOR(S) : YASUSHI TANIGUCHI, ET AL.

It is certified that error appears in the above-identified patent and that said Letters Patent is hereby corrected as shown below:

COLUMN 21

Line 25, "with" should be deleted.

COLUMN 22

Line 9, "conductive member." should read --said first or second conductive members.--.
  Line 39, "$5\times10^{-1}$" should read --$5\times10^{-2}$--.

Signed and Sealed this

Twenty-first Day of June, 1994

Attest:

BRUCE LEHMAN

Attesting Officer  Commissioner of Patents and Trademarks